Figure 1:
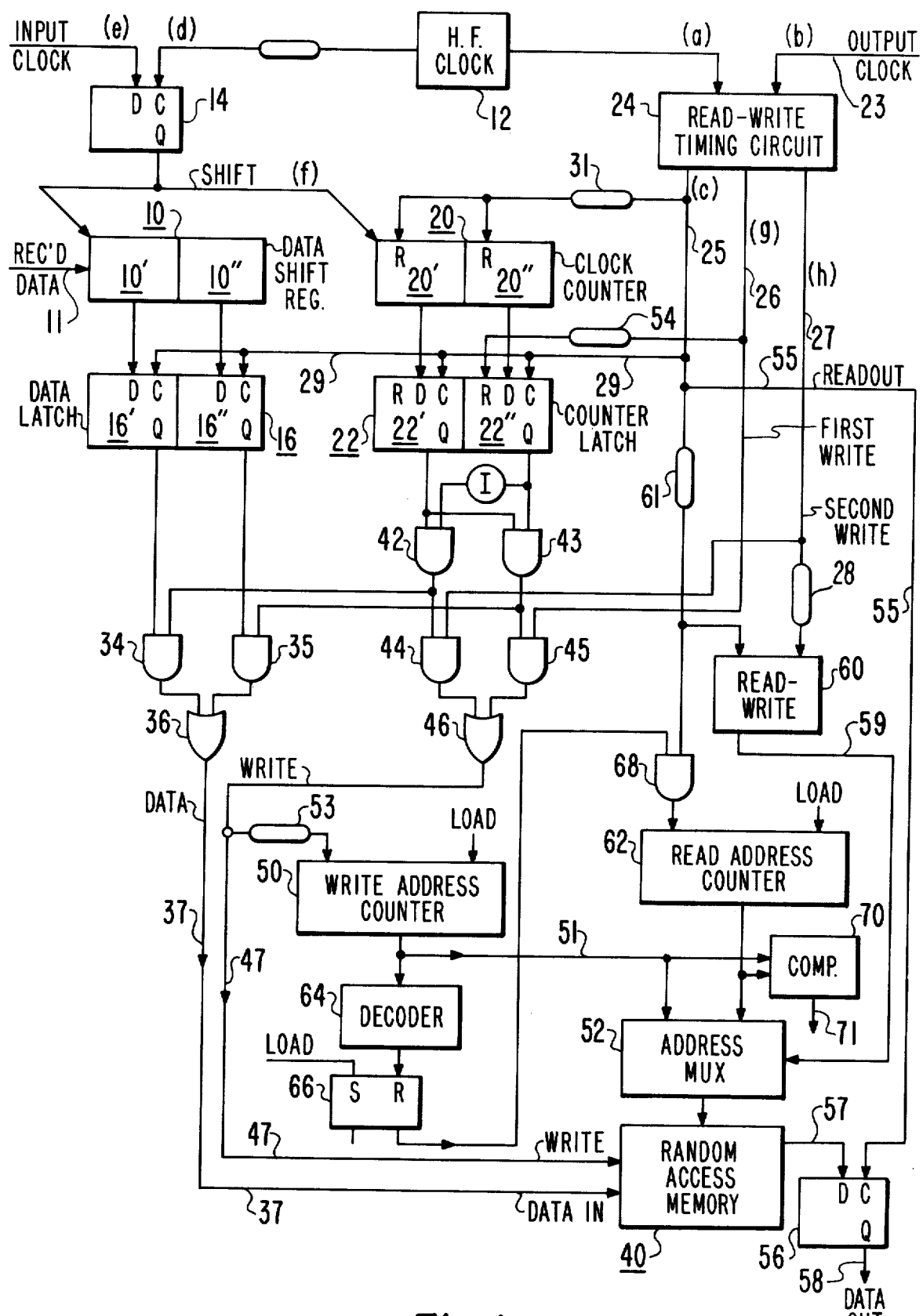

@# United States Patent [19]

Hovagimyan et al.

[11] 4,056,851
[45] Nov. 1, 1977

[54] ELASTIC BUFFER FOR SERIAL DATA

[75] Inventors: Norman Hovagimyan, Cherry Hill; John Michael Link, Westmont, both of N.J.

[73] Assignee: RCA Corporation, New York, N.Y.

[21] Appl. No.: 724,915

[22] Filed: Sept. 20, 1976

[51] Int. Cl.[2] .............................................. G06F 5/06
[52] U.S. Cl. .................................................. 364/900
[58] Field of Search ................. 340/172.5; 179/15 AF

[56] References Cited

U.S. PATENT DOCUMENTS

| 3,421,147 | 1/1969 | Burton et al. | 340/172.5 |
| 3,588,840 | 6/1971 | Nomura et al. | 340/172.5 |

Primary Examiner—Gareth D. Shaw
Assistant Examiner—Thomas M. Heckler
Attorney, Agent, or Firm—H. Christoffersen; Samuel Cohen; Carl V. Olson

[57] ABSTRACT

An elastic buffer, including a single random access memory, receives information bits at a rate determined by a receiving clock, and transmits the information bits at a rate determined by an output clock, where the clocks are not exactly synchronous. A read-write memory timing circuit synchronized by the output clock repeatedly produces a read pulse followed by first and a second spaced write pulses. In response to the read pulse, a bit is read out from the memory at an address determined by the contents of an address counter. In response to the first write pulse, a first received bit, if received, is written into the memory at an address determined by the contents of a read address counter. In response to the second write pulse, a second received bit, if received, is written into the memory at an address determined by the contents of the read address counter. An alarm is given if the numbers in the address counters are equal, indicating that the memory is empty, or filled and about to overflow.

6 Claims, 2 Drawing Figures

ELASTIC BUFFER FOR SERIAL DATA

BACKGROUND OF THE INVENTION

In a digital communications system it is frequently necessary to accept data from a remote source and synchronize it to a local or output clock. One example of this is an incoming time division multiplex (TDM) data stream whose various data channels must be routed to separate destinations through a TDM switching center. A conventional way of handling this situation is to use a double rank register. The received data is shifted in serially by the received or input clock, a parallel transfer is made to the output register, and the data is sent out under the control of the local or output clock. This method is useful for transferring short bursts of data.

Where two asynchronous systems must be buffered for longer intervals, random access memories are used. The technique is to write the input data into the random access memory using the received clock to operate a sequential address counter. At some later time, the memory is read out by addressing it through a counter operated by the local or output clock. While the data is being read out, the new received data must be stored in a different memory chip because a memory cannot be written into and read from simultaneously. This method therefore requires a multiplicity of memory chips, and the arrangement overflows when both input and output address counters attempt to access the same memory chip. If the buffer is composed of $n$ memory chips of $k$ bits each, and is initialized to half full, the maximum buffering time can be defined as:

$$t = (\tfrac{1}{2}kn - k)/\Delta f$$

where $\Delta f$ is the frequency difference between the input and output clocks. This arrangement thus has two shortcomings: It requires a plurality of memory chips, and it wastes $k$ bits of memory. There is a need for an improved elastic buffer including a single read-write memory chip, and having a maximum buffering time defined as:

$$t = \tfrac{1}{2}kn/\Delta f$$

SUMMARY OF THE INVENTION

An elastic buffer embodying the invention includes a single random access memory from which information bits are read out at a rate determined by an output clock, and into which received information bits are written at a rate determined by an input clock, where the two clocks are not exactly synchronous. Timing and storage means are provided to accommodate the zero, one or two information bits, which may be received for storage in the memory, in the interval between the readout of two successive information bits from the memory. An alarm is given if the input and output clock rates are such that the memory is emptied, or is filled and about to overflow.

BRIEF DESCRIPTION OF THE PREFERRED EMBODIMENT

Figure 2:
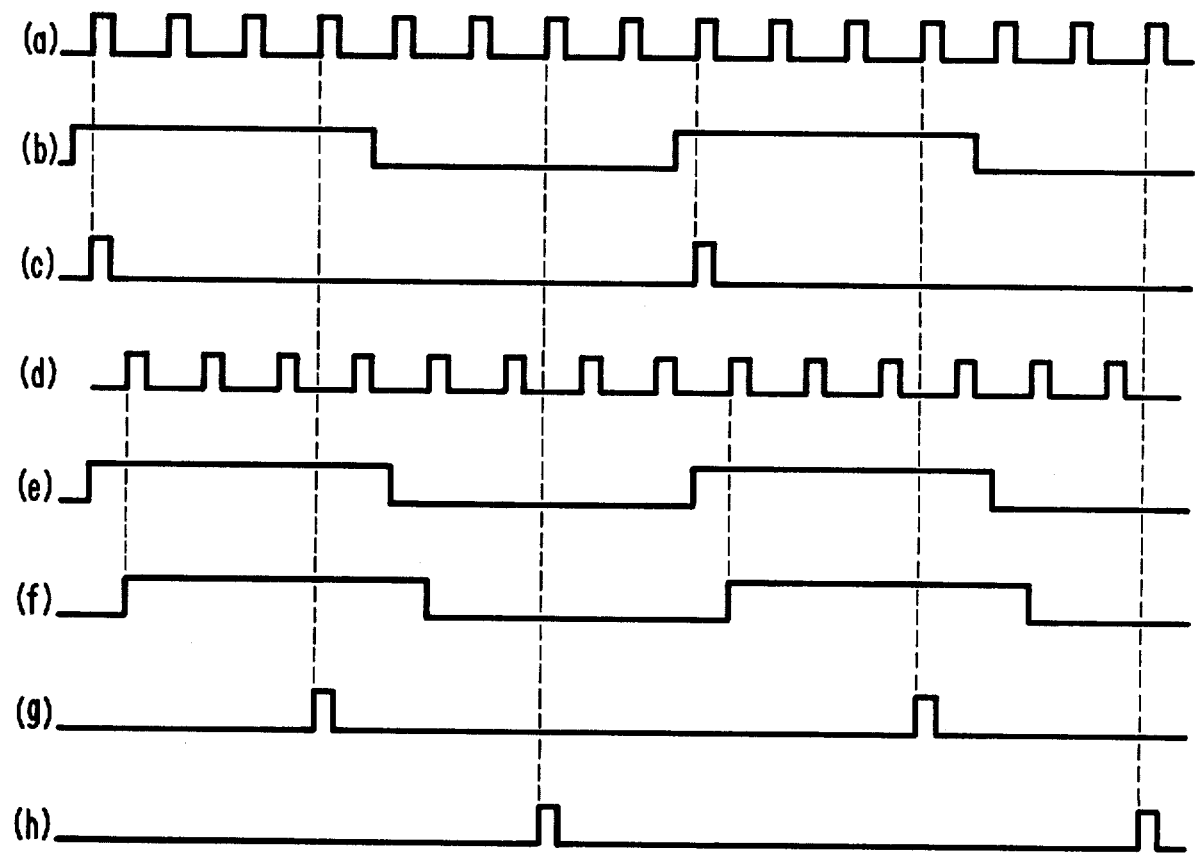

FIG. 1 is a block diagram of an elastic buffer constructed according to the teachings of the invention; and FIG. 2 is a chart of electrical waveforms which will be referred to in explaining the operation of the apparatus of FIG. 1.

The elastic buffer shown in FIG. 1 includes a two-bit data input buffer in the form of a shift register 10 which receives serial input information bits over input line 11. Data is shifted into the register 10 under control of timing circuits including a high-frequency clock 12 having a clock output signal ($a$) in FIG. 2, and having a delayed output signal ($d$) applied to an input clock flip-flop 14. The flip-flop also receives an input clock signal ($e$) for clocking in the received data on line 11. The flip-flop 14 produces a shift signal ($f$) for shifting received data into shift register 10. The purpose of flip-flop 14 is to insure that data will not be shifted into register 10 at the same time that data is shifted out of the register to a data latch 16 by timing means to be described.

At the same time that information bits are shifted into register 10, a count is kept of the number of bits received by a two-stage clock counter 20 which counts the leading edges of the shift pulses ($f$) from flip-flop 14. The two-stage counter 20 counts in a Gray code fashion as follows:

| Numerical | Binary |
|---|---|
| 0 | 0 0 |
| 1 | 1 0 |
| 2 | 1 1 |

The contents of clock counter 20 is transferred to a counter latch 22 at the same time as the contents of data shift register 10 is transferred to data latch 16.

The transfers are controlled by circuits including a read-write timing circuit 24 which receives a high-frequency clock pulse signal ($a$) from clock 12, and receives an output clock signal ($b$). The timing circuit operates in a conventional manner to produce a read pulse wave ($c$) on line 25, a first write pulse wave ($g$) on line 26, and a second write pulse wave ($h$) on line 27. The read or readout pulse wave ($c$) acting over line 29 causes the transfer of data from shift register 10 to data latch 16, and the transfer of a count from clock counter 20 to counter latch 22. The read pulse ($c$) after a delay introduced by delay device 31 causes a resetting of the clock counter 20 to a count of 0 0.

The outputs Q of the two stages of the data latch 16 are coupled through respective "and" gates 34 and 35 and through an "or" gate 36 to the data input line 37 of a random access memory 40. The outputs Q of the two stages of the counter latch 22 are coupled through respective "and" gates 42 and 43, and through respective "and" gates 44 and 45, and through an "or" gate 46 to the write command input line 47 to the random access memory 40. The inputs to "and" gates 42 and 43 are provided with a cross coupling including an inverter I so that if one information bit was received by data latch 16 and the counter latch contains binary 1 0, then gate 42 is enabled, and gate 43 is inhibited. On the other hand, if two information bits were received, and the counter latch contains 1 1, then gate 42 is inhibited and gate 43 is enabled. The outputs of gates 42 and 43 are connected also to enabling inputs of gates 34 and 35.

When an information bit on line 37 is written into memory 40 upon a write command on line 47, the location in the memory where the bit is stored is determined by an address supplied from a write address counter 50 over lines 51 and through an address multiplexer 52 to the memory 40. The write pulse on line 47 is then delayed by delay device 53 and used to increment the write address counter 50.

A data output flip-flop 56 operates in response to a readout pulse on line 55 to pass an information bit from memory 40 over line 57 to the data output line 58. A readwrite flip-flop 60 when reset, causes the address multiplexer 52 to pass the contents of the read address counter 62 to the memory 40. After flip-flop 60 is set through a delay device 61, the address multiplexer 52 passes the contents of the write address counter 50 to the memory 40.

A decoder 64, an initialize or load flip-flop 66, and an "and" gate 68 are used undercontrol of a "load" command, from a source not shown, to load the memory 40 half full of received information bits while preventing the reading out of information bits from the memory. A comparator 70 compares the contents of the write address counter 50 and the read address counter 62 and provides an alarm output at 71 when they are equal.

OPERATION

In operation, the elastic buffer of FIG. 1 reads out one information bit for transmission every time an output clock pulse (b) occurs and causes the generation of a read pulse (c). In the interval until the next output clock pulse (b) occurs, zero, one or two information bits may be received, at a rate indicated by the input clock signal (e), and written into the memory 40.

A cycle of operation of the elastic buffer will be described starting with the condition in which the read-write flip-flop 60 is in a reset condition, so that it acts over line 59 to cause the address multiplexer 52 to connect the contents of the read address counter 62 to the random access memory 40. An addressed information bit in memory 40 is then present on line 57 at the D input of data output flip-flop 56. Then, when an output clock pulse (b) is received at 23, the read-write timing circuit 24 produces a readout pulse (c) on line 25 which is applied over line 55 to the C input of data output flip-flop 56. The information bit read out from the memory is then provided on data output line 58.

Now, in the meantime, a single information bit will normally have been received over line 11 and have been shifted into the first stage 10' of data shift register 10 by a shift pulse (f) derived in flip-flop 14 from the input clock pulse (e). The shift pulse (f) will also have advanced the clock counter 20 from binary 0 0 to 1 0. At the same time that the readout pulse (c) is causing the readout of a bit from memory, the readout pulse is applied over line 29 to cause the transfer of the contents of the data shift register 10 and the clock counter 20 to the data latch 16 and the counter latch 22.

After a delay, following the readout pulse (c), produced by delay device 61, the read-write flip-flop 60 is set to the "write" state so that the multiplexer will pass the contents of the write address counter 50 to the memory 40. Also, the delayed readout pulse, acting through gate 68, increments the read address counter 62. Further, the delayed readout pulse, delayed by delay device 31, is used to reset the clock counter 20 to a count of 0 0. Then the read-write timing circuit 23 produces a first write pulse (g) on line 26 which is utilized only when two information bits have been received.

Next, the read-write timing circuit 24 produces a second write pulse (h) which is applied over line 27 through gate 44 (enabled through gate 42 by the count in counter latch 22') and through "or" gate 46 to the write command input 47 of the memory 40. At the same time, the output of gate 42 enables gate 34 to pass the information bit from data latch 16' through "or" gate 36 to the data input 37 of the memory 40. The information bit is stored in the memory at a location determined by the address in the write address counter 50. After a delay produced by delay device 53, the write address counter is incremented by one.

Having described the normal operation in which one information bit is received in the interval when one information bit is transmitted, the operation when two information bits are received in the interval will be described. This occurs when the input clock is at a higher rate than the output clock. With two information bits received, the count in counter latch 22 is binary 1 1, which enables gate 43. When the read-write timing circuit 24 produces the first write pulse (g) one line 26, the pulse is applied through gate 45 (enabled by gate 43) and "or" gate 46 to the write input 47 of memory 40. At the same time, gate 43 enables gate 35 to pass the first received information bit from data latch 16" to the data input 37 of the memory. After a delay produced by delay device 54, the counter latch second stage 22" is reset so that the latch now contains binary 1 0. The circuit is now prepared to write the second received information bit contained in data latch 16' into the memory in the same manner as described above when only a single bit was received.

If the input clock is at a rate less than the output clock, there will be intervals during which no information bit is received. In this case the first and second write pulses are blocked by disabled gates 44 and 45.

The second write pulse (h) on line 27 is applied through delay device 28 to reset the read-write flip-flop 60 to the read state in preparation for the following operation of reading out the next bit from the memory 40 to the output line 58. The described operation then repeats.

It is seen that the bits read out are determined by the readout clock (b), and that there may be zero, one or two bits written into the memory in a corresponding interval depending on the relative rate of the input clock (e).

If the input clock is slower than the output clock for an appreciable period of time, the memory 40 will become emptied; and if the input clock is faster, the memory will become filled and unable to accept all received bits. Either event will be detected by the comparator 70 when the addresses in the write and read address counters 50 and 62 are equal. The comparator 70 then produces an alarm output at 71 which is used to reinitialize the buffer.

To initialize the elastic buffer, a "load" command is applied to reset imputs of the address counters 50 and 62, resetting them to zero. The "load" command is also applied to set initialize flip-flop 66 so that its output disables gate 68 and prevents the incrementing of the read address counter 62. The system then operates to accept and write received bits into successive memory locations while readout of successive locations is inhibited. When the memory is half full as indicated by the contents of the address in write address counter 50, this fact is sensed by decoder 64 and its output resets the flip-flop 66. Then the gate 68 is no longer inhibited and read out from successive memory locations is started. Thereafter, the operation continues in the normal fashion unless and until an emptying or filling of the memory occurs.

It will be understood by those skilled in the art that the elastic buffer may alternatively be constructed so that an information bit is written into the memory 40 every time an input bit and an input clock pulse are received. In this case, the two-bit data shift register 16 and the clock counter 20 are sensed to the output side of the memory 40 and operated so that zero, one or two information bits may be read out of the memory in the interval between two received bits, depending on the frequency of the output clock in relation to the frequency of the input clock.

What is claimed is:

1. An elastic buffer for receiving information bits at a rate determined by a receiving clock, and transmitting the information bits at a rate determined by an output clock, where the clocks are not exactly synchronous, comprising
    a two-bit data input buffer,
    a random access memory,
    a read-write memory timing circuit synchronized by said output clock and repeatedly producing a read pulse followed by first and a second spaced write pulses,
    a read address counter and a write address counter,
    means responsive to said read pulse to read out a bit from said memory at an address determined by the contents of said read address counter, and then increment said counter,
    means responsive to said first write pulse and the presence of a first received bit in said two-bit buffer to write said bit into said memory at an address determined by the contents of said write address counter, and then increment said counter, and
    means responsive to said second write pulse and the presence of a second received bit in said two-bit buffer to write said bit into said memory at an address determined by the contents of said write address counter, and then increment said counter.

2. A buffer according to claim 1, and in addition, means to initialize said buffer comprising means for partially filling said memory with received information bits before starting to read information bits from the memory.

3. A buffer according to claim 1 and, in addition, means to fill said memory half full of received information bits before starting to read information bits from the memory.

4. A buffer according to claim 1, and in addition,
    sources of clock pulses at said transmitting and receiving rates,
    means to synchronize one of the memory read and write operations with a corresponding one of said transmitting and receiving clock pulses, and
    means operative during each of said operations to perform zero, one or two of the other of said memory read and write operations as required by the corresponding one of said transmitting and receiving clock pulses.

5. A buffer according to claim 1, and in addition,
    sources of clock pulses at said transmitting and receiving rates,
    means to synchronize each memory read operation with a corresponding transmitting clock pulse, and
    means operative between successive ones of said memory read operations to perform a number including zero of memory write operations determined by the number of receiving clock pulses occurring between successive transmitting clock pulses.

6. A buffer according to claim 1, and in addition,
    sources of clock pulses at said transmitting and receiving rates,
    means to synchronize each memory write operation with a corresponding receiving clock pulse, and
    means operative between successive ones of said memory write operations to perform a number including zero of memory read operations determined by the number of transmitting clock pulses occurring between successive receiving clock pulses.

* * * * *